(12) United States Patent
Katrak et al.

(10) Patent No.: US 8,510,004 B2
(45) Date of Patent: Aug. 13, 2013

(54) TRANSMISSION CONTROL MODULE WITH VALVE CONTROL

(75) Inventors: Kerfegar Khurshed Katrak, Kalamazoo, MI (US); Jeffrey Philip Hawarden, Lancashire (GB); Steven Harvey Lapointe, Plainwell, MI (US); Eric Allen Metheny, Coldwater, MI (US); Todd William Fritz, Kalamazoo, MI (US); John Kimmel Vandervoort, Delton, MI (US)

(73) Assignee: Eaton Corporation, Cleveland, OH (US)

( * ) Notice: Subject to any disclaimer, the term of this patent is extended or adjusted under 35 U.S.C. 154(b) by 554 days.

(21) Appl. No.: 12/718,496

(22) Filed: Mar. 5, 2010

(65) Prior Publication Data

US 2010/0228455 A1    Sep. 9, 2010

Related U.S. Application Data

(60) Provisional application No. 61/157,968, filed on Mar. 6, 2009.

(51) Int. Cl.
 *F16H 61/12* (2010.01)
(52) U.S. Cl.
 USPC .............. 701/62; 701/58; 701/68; 477/906; 74/335
(58) Field of Classification Search
 USPC ............ 701/51, 58, 62, 68, 67; 477/906, 477/907; 192/3.58, 48.601; 74/335
 See application file for complete search history.

(56) References Cited

U.S. PATENT DOCUMENTS

| 5,021,955 | A | * | 6/1991 | Ito et al. ......................... 701/62 |
| 5,052,246 | A | * | 10/1991 | Yamaguchi .................. 477/155 |
| 5,325,083 | A | | 6/1994 | Nassar et al. |
| 5,370,015 | A | | 12/1994 | Moscatelli |
| 5,371,487 | A | | 12/1994 | Hoffman et al. |
| 5,406,860 | A | | 4/1995 | Easton et al. |
| 5,438,489 | A | * | 8/1995 | Judy et al. .................... 361/191 |
| 5,519,393 | A | | 5/1996 | Brandestini |
| 5,561,416 | A | | 10/1996 | Marshall et al. |
| 5,601,513 | A | | 2/1997 | Arai et al. |
| 5,714,852 | A | | 2/1998 | Enderich |
| 5,736,701 | A | | 4/1998 | O'Brien et al. |
| 5,754,963 | A | | 5/1998 | Nunneley et al. |
| 5,847,344 | A | | 12/1998 | Denyer et al. |

(Continued)

FOREIGN PATENT DOCUMENTS

WO    WO 2007/096126 A1 *  8/2007

*Primary Examiner* — Ruth Ilan
(74) *Attorney, Agent, or Firm* — Rader, Fishman & Grauer PLLC (57) ABSTRACT

An exemplary system includes at least one valve configured to control fluid flow in a dual-clutch transmission system. A solenoid is operably connected to the at least one valve and configured to move the valve to a plurality of positions. A primary processing unit is in communication with the solenoid and configured to determine an intended position of the valve. A controller is configured to receive the intended position of the valve from the primary processing unit and generate a primary control signal associated with the intended position of the valve. The solenoid is configured to move the valve to the intended position based on the primary control signal. A secondary processing unit is configured to receive information from the primary processing unit and prevent the primary control signal from controlling the solenoid if the primary processing unit is unable to control the solenoid.

19 Claims, 6 Drawing Sheets

U.S. PATENT DOCUMENTS

| | | | |
|---|---|---|---|
| 5,957,800 A * | 9/1999 | Oba et al. | 475/119 |
| 6,018,294 A | 1/2000 | Vogel et al. | |
| 6,069,988 A | 5/2000 | Kokura et al. | |
| 6,072,390 A | 6/2000 | Dourra et al. | |
| 6,183,395 B1 * | 2/2001 | Ochi et al. | 477/143 |
| 6,223,113 B1 | 4/2001 | McCunn et al. | |
| 6,253,136 B1 | 6/2001 | Stratton et al. | |
| 6,324,040 B1 | 11/2001 | Saladin et al. | |
| 6,376,929 B1 | 4/2002 | Nakajima | |
| 6,382,041 B1 * | 5/2002 | Burgbacher et al. | 74/335 |
| 6,405,611 B1 | 6/2002 | DeJonge et al. | |
| 6,411,879 B2 | 6/2002 | Kupper et al. | |
| 6,492,900 B2 | 12/2002 | Rankin | |
| 6,546,780 B1 | 4/2003 | Palfenier et al. | |
| 6,589,132 B2 * | 7/2003 | Amisano et al. | 477/77 |
| 6,866,611 B2 | 3/2005 | Tsuzuki et al. | |
| 6,904,823 B2 | 6/2005 | Levin et al. | |
| 7,042,363 B2 | 5/2006 | Katrak et al. | |
| 7,142,132 B2 | 11/2006 | Katrak et al. | |
| 7,242,329 B2 | 7/2007 | Katrak | |
| 7,280,333 B2 | 10/2007 | Horsky et al. | |
| 7,383,120 B2 | 6/2008 | Stockbridge et al. | |
| 7,549,108 B2 | 6/2009 | Katrak et al. | |
| 8,113,988 B2 * | 2/2012 | Foster | 477/125 |
| 8,204,712 B2 * | 6/2012 | Katrak | 702/150 |
| 2004/0226785 A1 * | 11/2004 | Sugimura | 188/182 |
| 2006/0082386 A1 | 4/2006 | Katrak et al. | |
| 2006/0100758 A1 | 5/2006 | Katrak et al. | |
| 2006/0149496 A1 | 7/2006 | Takeuchi | |
| 2006/0179962 A1 * | 8/2006 | Katrak et al. | 74/335 |
| 2006/0190142 A1 | 8/2006 | Katrak et al. | |
| 2007/0101236 A1 | 5/2007 | Bauerle et al. | |
| 2008/0176706 A1 * | 7/2008 | Wu et al. | 477/5 |
| 2009/0164058 A1 * | 6/2009 | Seufert et al. | 701/29 |
| 2010/0228431 A1 * | 9/2010 | Katrak | 701/34 |
| 2011/0046859 A1 * | 2/2011 | Beyse | 701/51 |
| 2011/0112736 A1 * | 5/2011 | Nakade et al. | 701/58 |
| 2011/0301803 A1 * | 12/2011 | Shimizu et al. | 701/29 |

* cited by examiner

TRANSMISSION CONTROL MODULE WITH VALVE CONTROL

CROSS-REFERENCE TO RELATED APPLICATION

This application claims priority to provisional patent application U.S. 61/157,968 filed on Mar. 6, 2009, the contents of which are incorporated by reference.

BACKGROUND

A vehicle may include a hydraulic system with electronically controlled valves that, for example, actuate clutches associated with a transmission system. The transmission system includes a transmission control module that electronically controls the operation of the valves. Specifically, the transmission control module includes a processor that, based on various conditions, determines whether to open or close one or more of the valves. The processor outputs the appropriate signals in light of its determinations and the valves respond accordingly. If the processor fails, however, the valves may open and close at the wrong times, causing the transmission system to malfunction. Accordingly, a transmission control module that is able to continue to control the valves if the processor fails is needed.

DETAILED DESCRIPTION

An exemplary system includes a transmission control module that is able to continue to control one or more valves if a processing unit is unable to do so. The transmission control module is part of a dual-clutch transmission system that includes at least one valve that controls fluid flow in the system. A dual-clutch transmission system utilizes two separate clutches for multiple gear sets. It can be described as two separate transmissions (with their respective clutches) contained within one housing, and working as one unit.

A solenoid is operably connected to each valve. A solenoid is a transducer device that converts energy into linear motion. Each solenoid is configured to move the valve to one or more positions. A primary processing unit determines an intended position of each valve based on various conditions. A controller receives the intended position of the valve from the primary processing unit and generates a primary control signal associated with the intended position of the valve. The solenoid moves the valve to the intended position based on the primary control signal. If the primary processing unit fails or is otherwise unable to control one or more of the solenoids, the transmission control module includes a secondary processing unit that prevents the primary control signal from controlling the solenoid. The secondary processing unit may further be configured to control each of the valves if the primary processing unit fails or if requested to do so by the primary processing unit.

Figure 1:
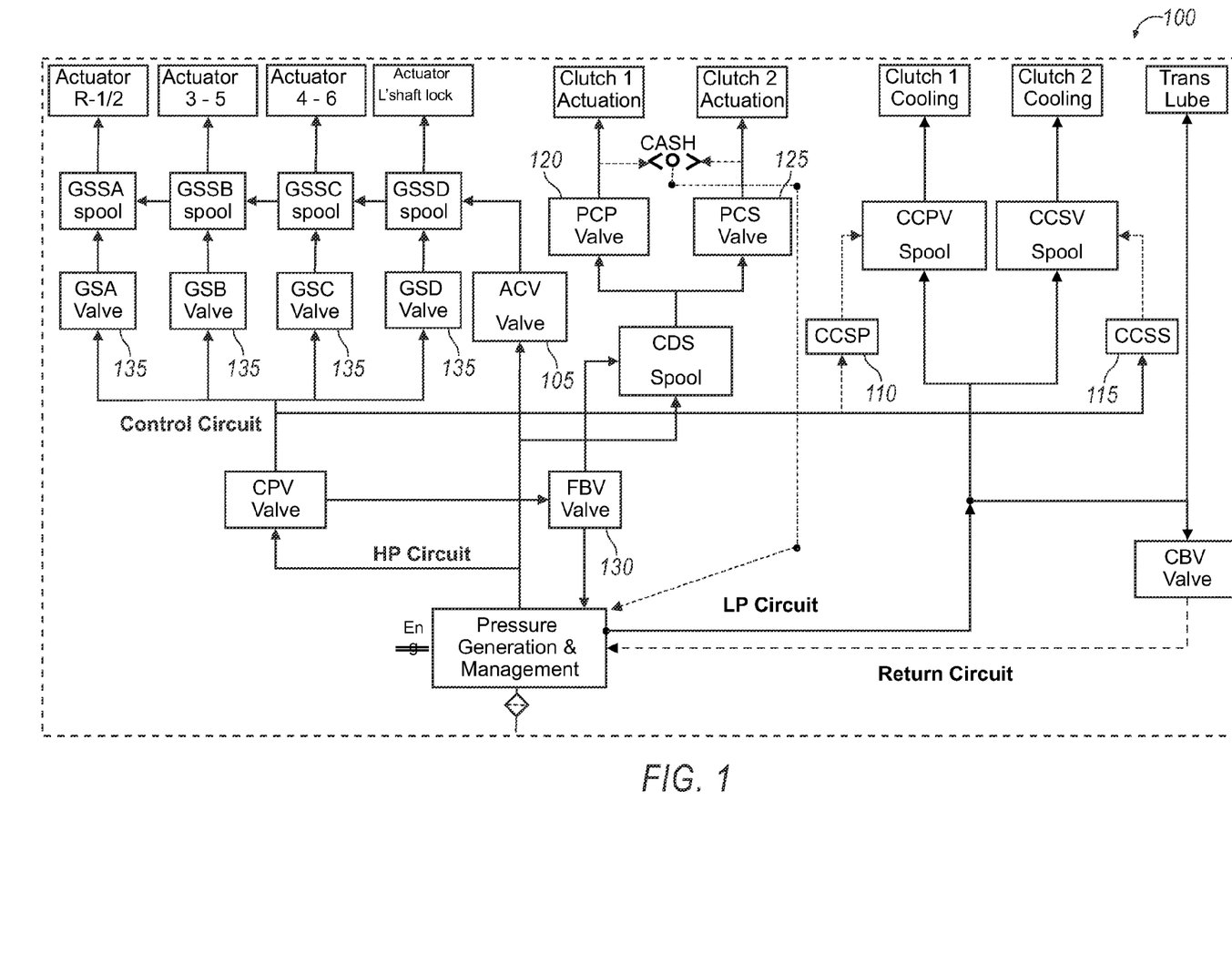
FIG. 1 illustrates an exemplary hydraulic schematic of a dual-clutch transmission system.

FIG. 1 illustrates an exemplary hydraulic schematic of a dual-clutch transmission system 100. The transmission system 100 may take many different forms and include multiple and/or alternate components and facilities. While an exemplary transmission system 100 is shown in FIG. 1, the exemplary components illustrated in the figures are not intended to be limiting. Indeed, additional or alternative components and/or implementations may be used.

The transmission system 100 may include a plurality of valves, including normally-open valves, normally-closed valves, or both, that control fluid flow in the dual-clutch transmission system 100. A normally-open valve may allow fluid to flow through a conduit until the valve is activated. When activated, the normally-open valve blocks the conduit to prevent fluid flow. A normally-closed valve may only allow fluid to flow through the conduit while the valve is activated. Otherwise, the normally-closed valve may block the conduit to prevent fluid flow.

The valves used in the transmission system 100 may include solenoid valves, such as variable bleed solenoid valves, variable force solenoid valves, or both. Solenoid valves may include any type of electromechanical valve that is controlled by an electric current through a solenoid coil. In one exemplary approach, the solenoid valve may include a plunger operatively connected to the coil. The plunger may be sized to prevent a fluid from flowing through a conduit. When activated, current flows through the coil, generating a magnetic force that moves the plunger. Thus, the magnetic force generated by the coil moves the plunger to either allow fluid to flow through the conduit or prevent fluid from moving through the conduit. In a normally-open valve, the plunger may be positioned to allow fluid to flow through the conduit and the coil may be positioned to push or pull the plunger to block the conduit when activated. In a normally-closed valve, the plunger may be positioned to block the conduit when the solenoid is not activated. Upon activation, the coil may be positioned to push or pull the plunger to allow fluid to pass through the conduit.

One or more of the valves may be configured to move to various positions when activated including fully open, fully closed, or partially open. For example, the valves may be proportional to achieve various intermediate positions. The specific position of the valve may be defined by a control signal provided to the solenoid coil as described in more detail below.

As illustrated in FIG. 1, the transmission system 100 may include an actuation control valve 105, a clutch cooling primary valve 110, a clutch cooling secondary valve 115, a pressure control primary clutch valve 120, a pressure control secondary clutch valve 125, a fall back valve 130, and one or more gear selection valves 135.

The actuation control valve 105 may be configured to control output line control pressure when the gears of the transmission system 100 are being shifted. The clutch cooling primary valve 110 may be configured to control the flow of a cooling fluid to a primary clutch, while the clutch cooling secondary valve 115 may be configured to control the flow of a cooling fluid to a secondary clutch. The pressure control primary clutch valve 120 may be configured to control pressure to the primary clutch actuator and the pressure control secondary clutch valve 125 may be configured to control pressure to the secondary clutch actuator. The fall back valve 130 may be configured to drive a clutch disposal spool valve and a fall back shift spool valve, allowing the fall back valve 130 to override the pressure control primary clutch valve 120 and the pressure control secondary clutch valve 125. The fall back valve 130 may be configured to perform other pressure and generation management functions. Each of the gear selection valves 135 may be configured to select between two different gears by directing fluid pressure toward one gear, away from one gear, or exhaust fluid pressure from both gears.

Figure 2:
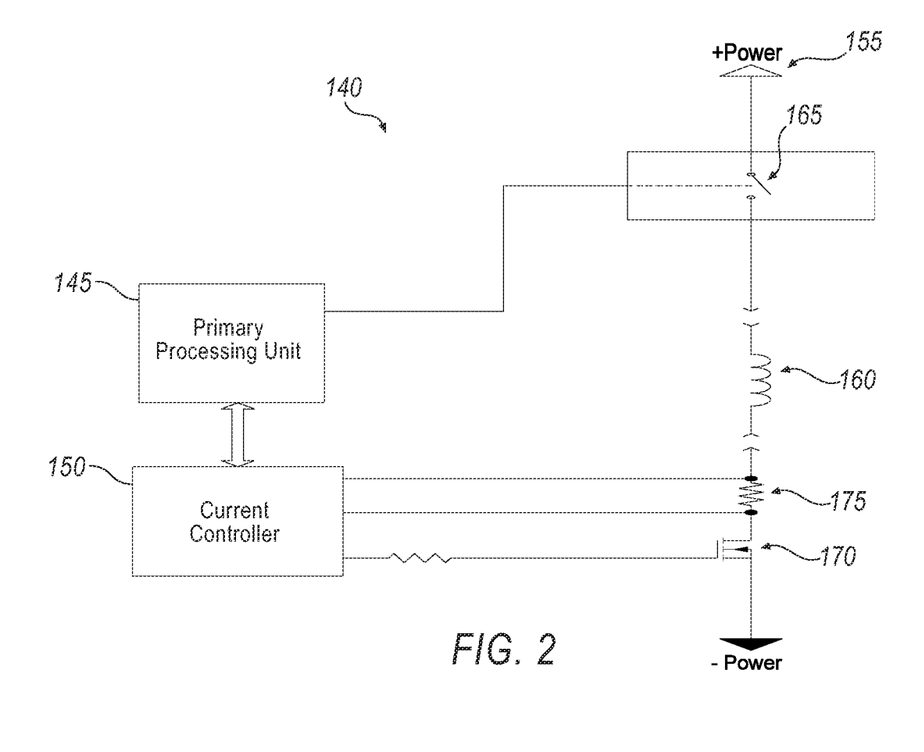
FIG. 2 illustrates an exemplary transmission control module used to control the exemplary hydraulic system of FIG. 1.

Referring now to FIG. 2, the transmission system 100 may include a transmission control module 140 configured to control one or more of the valves. The transmission control module 140 may include a primary processing unit 145 and a controller 150. To control the valves, the transmission control module 140 may further include a power source 155 configured to provide a current to the solenoid 160 of each valve controlled by the transmission control module 140, a primary switch 165 in series with the power source 155 and the solenoid 160, and a primary signal generator 170 in series with the solenoid 160 and the power source 155.

The primary processing unit 145 may include any processing device configured to determine how to control the valves in the transmission system 100 based on various conditions. The conditions may include the gear selected by a driver of the vehicle, the speed of an engine, the speed of one or more input shafts of the transmission, the speed of an output shaft of the transmission, a temperature, a pressure, etc. Based on these conditions, the primary processing unit 145 may be configured to identify an intended position of the valve and cause one or more of the valves to fully open, partially open, or fully close based on the intended position. Additionally, the primary processing unit 145 may be configured to open or close the primary switch 165. When open, the primary switch 165 may prevent current from flowing through the solenoid 160. However, when the primary switch 165 is closed, current may flow from the power source 155 to the solenoid 160. Accordingly, the primary processing unit 145 may power the solenoid 160 by closing the primary switch 165.

The controller 150 may include any processing device configured to receive instructions from the primary processing unit 145 regarding the control of the valves. For instance, the controller 150 may receive the intended position of one or more of the valves from the primary processing unit 145 and generate a primary control signal associated with the intended position. The controller 150 may be further configured to output the primary control signal to the solenoid 160, which may cause the solenoid 160 to move the valve to the intended position.

In addition, the transmission control module 140 may include a resistor 175 in series with the solenoid 160 and the primary signal generator 170. The controller 150 may be configured to measure a current through the resistor 175 that is representative of the current through the solenoid 160. The controller 150 may communicate the current through the solenoid 160 to the primary processing unit 145.

The primary signal generator 170 may be configured to receive the primary control signal from the controller 150. Based on the primary control signal received, in one exemplary approach, the primary signal generator 170 is configured to generate a signal to control the solenoid 160. For instance, the primary signal generator 170 may generate a pulse-width modulation signal based on the primary control signal received from the controller 150. The solenoid 160 may receive the pulse-width modulation signal from the primary signal generator 170 and open or close the valve accordingly. Specifically, different ranges of duty cycles of the pulse-width modulation signal generated by the primary signal generator 170 may correspond to different positions of the valve. For example, a duty cycle of 15-25% may correspond to a fully closed position, a duty cycle of 40-60% may correspond to one or more partially open positions, and a duty cycle of 90-100% may correspond to a fully open position. The primary signal generator 170 may include any device capable of controlling the solenoid 160 such as a semiconductor device such as a bipolar junction transistor or a field-effect transistor. Although illustrated as a transistor, the primary signal generator 170 may include other devices in addition to or instead of the transistor. Additionally, the primary control signal may include other types of signals besides a pulse-width modulation signal. For instance, the primary control signal may include an on/off transistor control signal.

Figure 3:
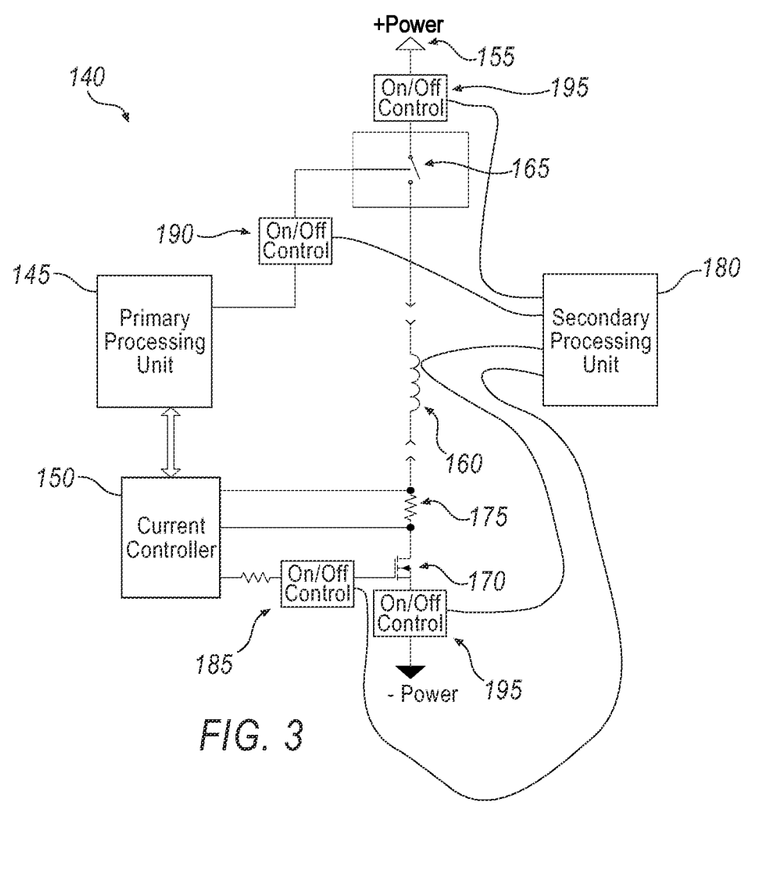
FIG. 3 illustrates an exemplary transmission control module having a primary processing unit and a secondary processing unit.

Referring now to FIG. 3, the transmission control module 140 may further include a secondary processing unit 180 configured to receive information from the primary processing unit 145. The secondary processing unit 180 may include any processing device configured to receive information concerning whether the primary processing unit 145 is able to control one or more of the solenoids. For instance, the secondary processing unit 180 may receive information indicating that the primary processing unit 145 has failed, that one of the solenoids 160 has failed, or that there is a current path (e.g., wire) failure etc. If so, the secondary processing unit 180 may be configured to prevent the primary control signal from controlling the solenoid 160. In addition, the secondary processing unit 180 may be configured to prevent the solenoid 160 from receiving current output by the primary power source 155.

In one exemplary approach, the secondary processing unit 180 may be configured to control one or more disable controllers to prevent the primary processing unit 145 from controlling the solenoid 160. The disable controllers may include, for instance, one or more switches that have at least two states, including one state that allows current to flow through the disable controller and another state that breaks a current path. The secondary processing unit 180 may be configured to control a first disable controller 185 that prevents the primary control signal from reaching the primary signal generator 170. The first disable controller 185 may have a first state that allows the primary control signal to be received at the primary signal generator 170. However, the first disable controller 185 may further include a second state that prevents the primary control signal from controlling the solenoid 160 via the primary signal generator 170. This way, the secondary processing unit 180 may disable the primary signal generator 170 by changing the state of the first disable controller 185.

Moreover, a second disable controller 190 may prevent the primary processing unit 145 from controlling the primary switch 165. Specifically, the second disable controller 190 may have a first state that allows current to flow from the primary processing unit 145 to the primary switch 165 and a second state that prevents current from flowing from the primary processing unit 145 to the primary switch 165. By breaking the current path between the primary processing unit 145 and the primary switch 165, the primary processing unit 145 is unable to control the primary switch 165. Thus, the secondary processing unit 180 may be configured to toggle the states of the first and second disable switches 185, 190 to prevent the primary processing unit 145 from controlling the solenoid 160.

Further, a third disable controller 195 may be connected in series with the solenoid 160 and the primary power source 155. In this exemplary approach, the secondary processing unit 180 may be configured to open the third disable controller 195 to prevent current from flowing through the solenoid 160. The transmission control module 140 may include any number of disable switches 195 in series with the solenoid 160. As illustrated, the transmission control module 140 includes two disable switches 195 in series with the solenoid 160. Because both the primary switch 165 and third disable controller 195 are in series with the primary power source 155 and the solenoid 160, both the primary switch and the third disable controller 195 may be used to stop all current flow to the solenoid 160. While the first and second disable controllers 185, 190 are able to prevent the primary processing unit 145 from controlling the solenoid 160, the secondary processing unit 180, by controlling the third disable controller 195, is able to disable the solenoid 160 by preventing all current flow to the solenoid 160.

The exemplary transmission control module 140 illustrated in FIG. 3 may be used to control one or more of the valves in the transmission system 100. For instance, the transmission control module 140 of FIG. 3 may be configured to control the clutch cooling primary valve 110, the clutch cooling secondary valve 115, the pressure control primary clutch valve 120, the pressure control secondary clutch valve 125, and one or more of the gear selection valves 135.

Figure 4:
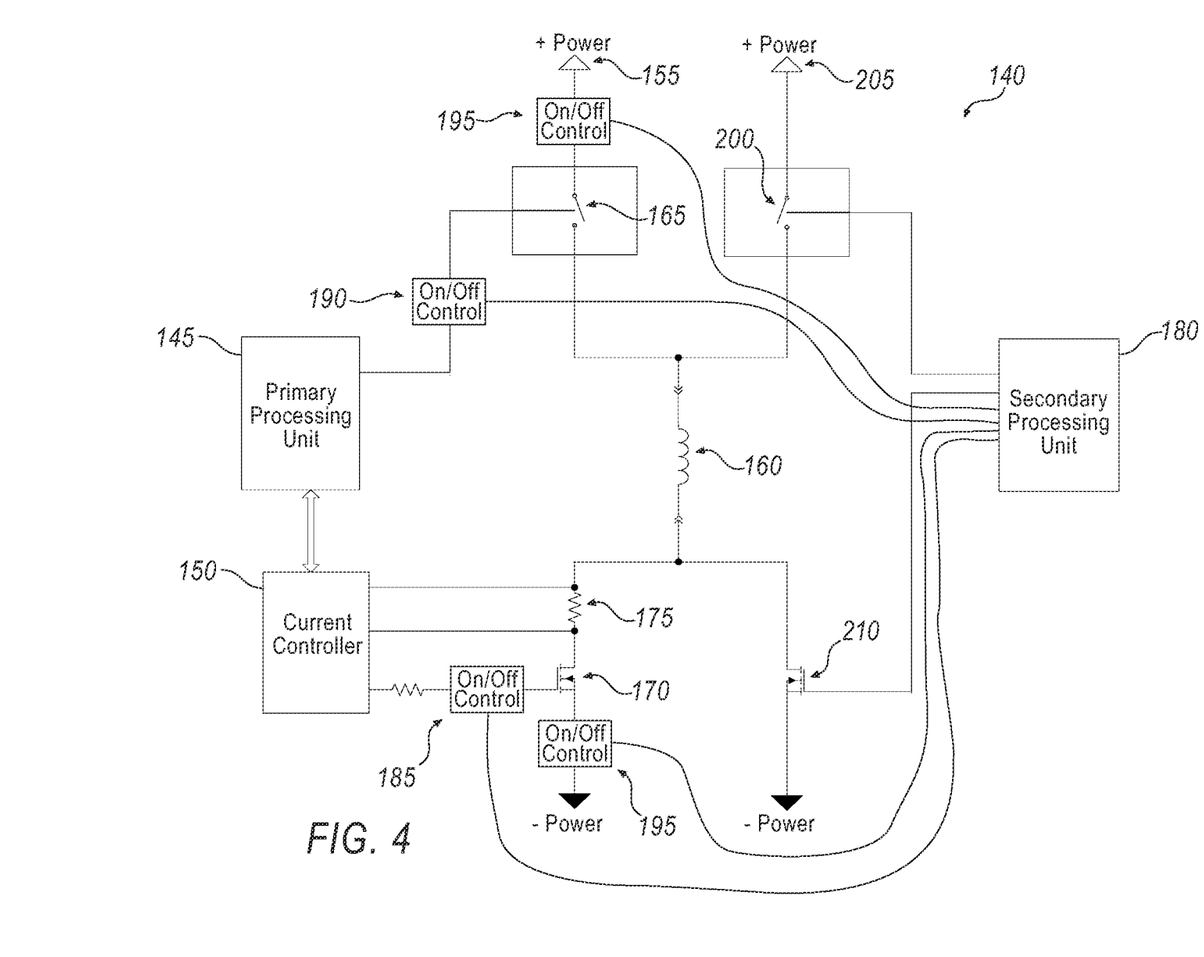
FIG. 4 illustrates another exemplary transmission control module having the primary processing unit and the secondary processing unit.

Referring to FIG. 4, in addition to preventing the primary processing unit 145 from providing power to the solenoid 160 and preventing the primary control signal from controlling the primary signal generator 170 using the disable switches described above, the secondary processing unit 180 may be configured to generate a secondary control signal to coarsely control the solenoid 160 of one or more valves if the primary processing unit 145 is unable to control the solenoid 160. Specifically, the secondary processing unit 180 may be configured to enable a secondary switch 200 disposed in series with the solenoid 160 and either the primary power source 155 or a secondary power source 205. A secondary switch 200 is placed in parallel with primary switch 165. When closed, the secondary switch 200 may allow current to flow from the secondary power sources 205 to the solenoid 160. Of course, the primary and secondary power sources 155, 205 may be the same power source.

In addition, a secondary signal generator 210 may be electrically connected in series to the solenoid 160 and parallel to primary signal generator 170. The secondary signal generator 210 may be configured to receive the secondary control signal from the secondary processing unit 180. Based on the secondary control signal received, in one exemplary approach, the secondary signal generator 210 may be configured to generate a signal to control the solenoid 160. For instance, the secondary signal generator 210 may generate a pulse-width modulation signal based on the secondary control signal received from the secondary processing unit 180. The solenoid 160 may receive the pulse-width modulation signal from the secondary signal generator 210 and open or close the valve accordingly. The secondary signal generator 210 may include any device capable of controlling the solenoid 160, such as a semiconductor device such as a bipolar junction transistor or a field-effect transistor. Although illustrated as a transistor, the secondary signal generator 210 may include other devices in addition to or instead of the transistor.

In the exemplary approach of FIG. 4, while having some control over the solenoid 160, the secondary processing unit 180 may not be configured to perform the closed-loop current control of the primary processing unit 145 as previously described with respect to FIG. 2. Moreover, the transmission control module 140 of FIG. 4 may be used with various valves, such as the fall back valve 130.

Figure 5:
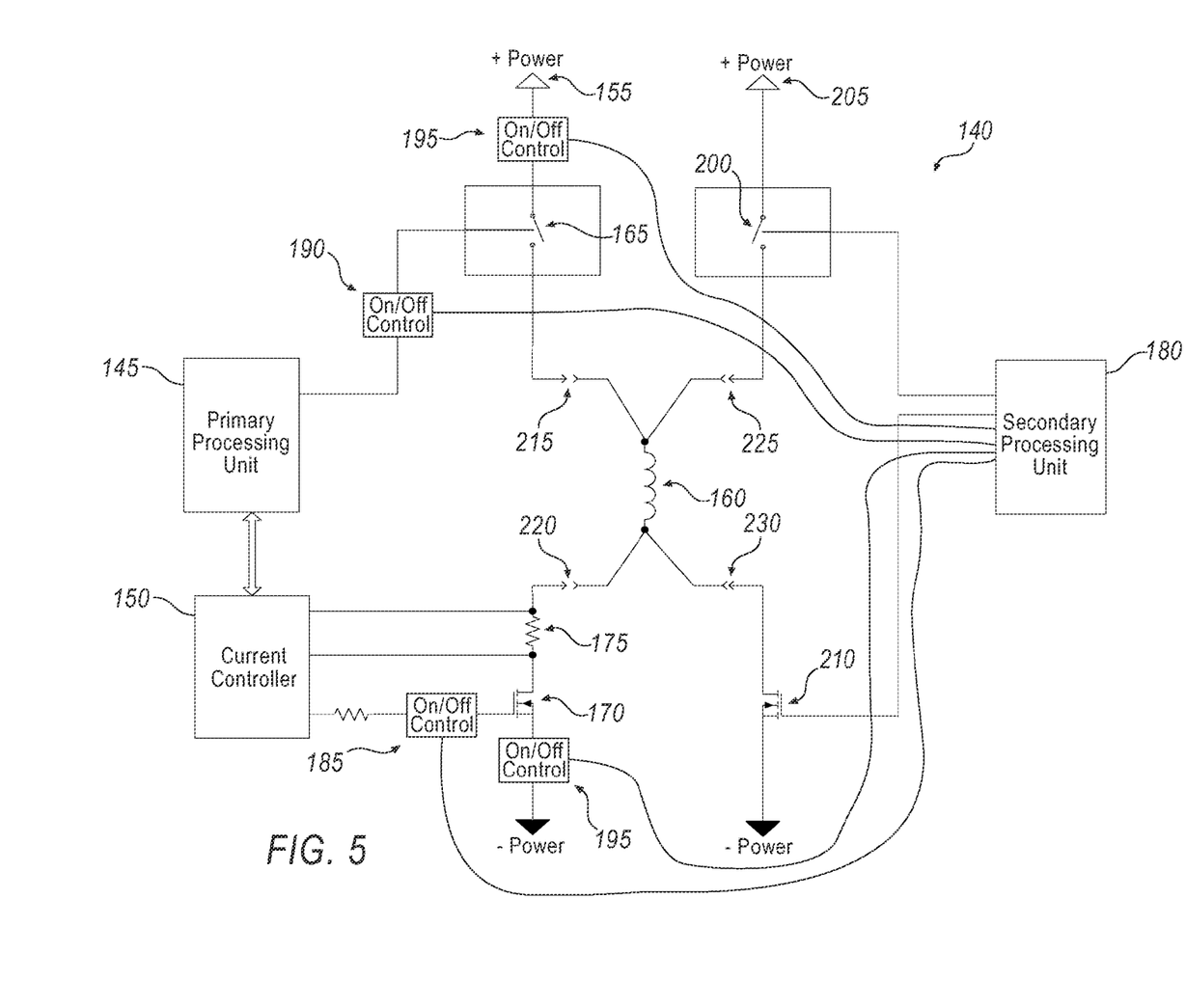
FIG. 5 illustrates yet another exemplary transmission control module having the primary processing unit and the secondary processing unit.

Referring now to FIG. 5, the secondary processing unit 180 may be configured to receive information from the primary processing unit 145 regarding a current path (e.g., wire) failure that prevents the solenoid 160 from responding correctly to the primary control signal. For instance, a current path failure between the primary switch 165 and the solenoid 160 or the solenoid 160 and the primary signal generator 170 may prevent the solenoid 160 from moving the valve to the intended position, regardless of whether the primary processing unit 145 is operating correctly. Current path failures may include a wire failure caused by a short to battery, a short to ground, or an open circuit.

To maintain control of the solenoid 160 during a current path failure, the transmission control module 140 may include different connectors. For instance, a first connector 215 may connect the solenoid 160 to the primary switch 165 while a second connector 220 may connect the solenoid 160 to the primary signal generator 170. A third connector 225 may connect the secondary switch 200 to the solenoid 160 and a fourth connector 230 may connect the solenoid 160 to the secondary signal generator 210. Of course, any number of connectors may be used.

The primary processing unit 145 may detect a current path failure if it is determined that the solenoid 160 has failed to correctly respond to the primary control signal. The secondary processing unit 180 may be configured to receive information from, for instance, the primary processing unit 145 that either the first or second connectors 215, 220 has failed and that the solenoid 160 is not responding to the primary control signal. If so, the primary processing unit 145 may voluntarily relinquish control of the solenoid 160 to the secondary processing unit 180. Since the secondary processing unit 180 connects to the solenoid 160 with different connects, current path failures that prevent the primary control signal from controlling the solenoid 160 do not necessarily prevent the secondary processing unit 180 from controlling the solenoid 160. For example, because the third and fourth connectors 225, 230 are separate from the first and second connectors 215, 220, a wire failure associated with the first or second connectors 215, 220 has no affect on the third and fourth connectors 225, 230. Accordingly, the secondary processing unit 180 may control the solenoid 160 using the secondary switch 200 and the secondary signal generator 210, allowing either the primary processing unit 145 or the secondary processing unit 180 to have both high-side and low-side control of the solenoid 160 of one or more valves.

If the primary processing unit 145 is to relinquish control of the solenoids 160 to the secondary processing unit 180, the secondary processing unit 180 may be configured to actuate one or more of the valves according to a predetermined sequence and at various times. For instance, when taking control of the fall back valve 130, the pressure control primary clutch valve 120, and the clutch cooling primary valve 110, the secondary processing unit 180 may be configured to actuate the fall back valve 130 to generate a high pressure. Then, the secondary processing unit 180 may disable the fall back valve 130 and the pressure control primary clutch valve 120 before disabling the clutch cooling primary valve 110. In another predetermined sequence, the secondary processing unit 180 may be configured to disable one or more of the gear selection valves 135 before disabling the actuation control valve 105.

Computing devices, such as the transmission control module 140, generally include computer-executable instructions, where the instructions may be executable by one or more processing units such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 6:
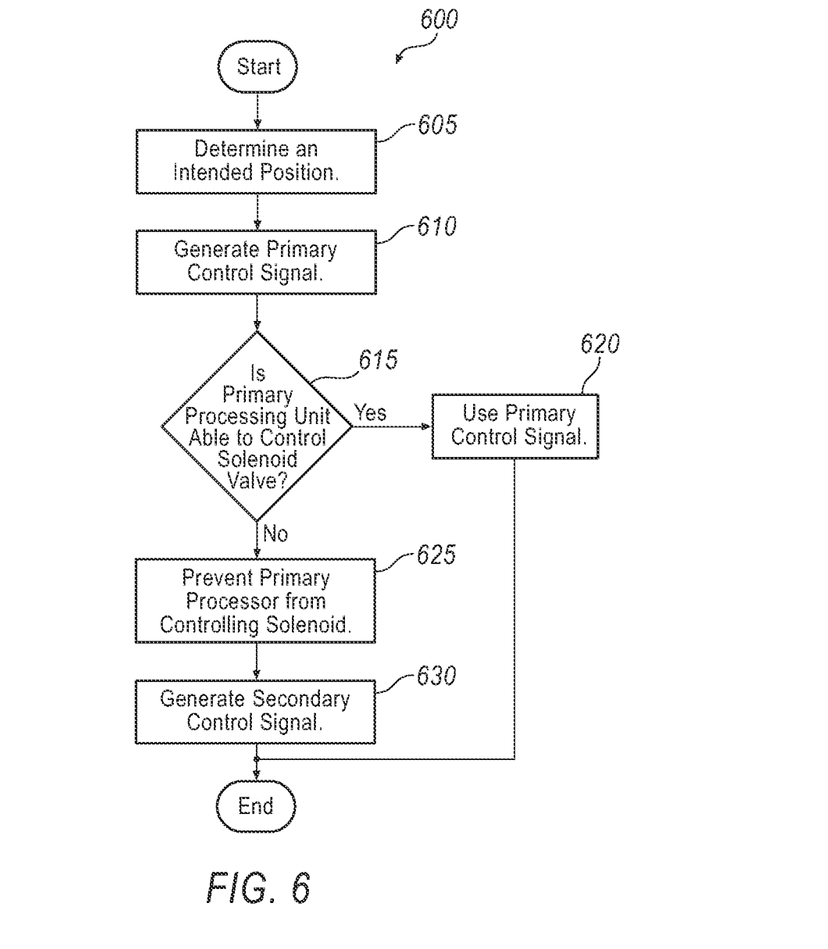
FIG. 6 illustrates an exemplary process flow diagram implemented by the transmission control module.

FIG. 6 illustrates an exemplary process 600 that may be performed by the transmission control module 140.

Block 605 may include determining an intended position of a valve configured to control fluid flow in a dual-clutch transmission system 100. The primary processing unit 145 may make such determination based on various conditions including the gear selected by a driver of the vehicle, the speed of an engine, the speed of one or more input shafts of the transmission, the speed of an output shaft of the transmission, a temperature, a pressure, etc. Based on some combination of such conditions, the primary processing unit 145 may be configured to identify the intended position of the valve and cause one or more of the valves to fully open, partially open, or fully close based on the intended position.

Block 610 may include generating a primary control signal associated with an intended position of the valve to enable a solenoid 160 to move the valve to the intended position. The primary processing unit 145 may communicate the intended position to the controller 150. The controller 150 may generate the primary control signal and output the primary control signal to the primary signal generator 170. The signal generated by the primary signal generator 170 may cause the solenoid 160 to move the valve to the intended position.

Decision block 615 may include determining whether the primary processing unit 145 is able to control the solenoid 160. For example, the secondary processing unit 180 may receive information from the primary processing unit 145, including whether the solenoid 160 is responding correctly to the primary control signal. The secondary processing unit 180 may further receive or determine information about the primary processing unit 145 itself, such as the rate at which the primary processing unit 145 communicates with the secondary processing unit 180 or the quality of the signals output by the primary processing unit 145. From the information received, the secondary processing unit 180 may be configured to determine whether the primary processing unit 145 is functioning correctly and, if so, use the primary control signal representing the intended valve position determined by the primary processing unit 145 as illustrated at block 620. If, however, the secondary processing unit 180 determines that the primary processing unit 145 is unable to control the solenoid 160 based on the information received, the secondary processing unit 180 may disable the primary processing unit and in some instances, control the valves with the secondary control signal as illustrated at block 625.

Block 625 may include preventing the primary control signal from controlling the solenoid 160 if the primary processing unit 145 fails. For instance, the secondary processing unit 180 may be configured to disable the primary switch 165 that allows current to flow to the solenoid 160 from the primary power source 155. When disabled, the solenoid 160 will not receive any current and will be unable to move the valve to the intended position. In addition, the secondary processing unit 180 may be configured to disable the primary signal generator 170, thus preventing the primary signal generator 170 from generating a pulse width modulation signal and outputting the pulse width modulation signal to control the solenoid 160.

Block 630 may include generating a secondary control signal if the primary processing unit 145 fails. As previously discussed, the secondary processing unit 180 may independently determine the intended valve position. With the intended valve position, the secondary processing unit 180 may generate and output the secondary control signal to the secondary signal generator 210. The secondary signal generator 210 may generate the pulse width modulation signal associated with the intended position and output the pulse width modulation signal to the solenoid 160 so that the solenoid 160 will move the valve to the intended position.

The process may end after block 630.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A system comprising:
   at least one valve configured to control fluid flow in a clutch-based transmission system;
   a solenoid operably connected to the at least one valve and configured to move the valve to a plurality of positions;
   a primary processing unit in communication with the solenoid and configured to determine an intended position of the valve and control current flow to the solenoid;
   a controller configured to receive the intended position of the valve from the primary processing unit and generate a primary control signal associated with the intended position of the valve and wherein the solenoid is configured to move the valve to the intended position based on the primary control signal; and
   a secondary processing unit configured to receive information from the primary processing unit and prevent the primary control signal from controlling current flow to the solenoid if the primary processing unit is unable to control the solenoid.

2. A system as set forth in claim 1, wherein the secondary processing unit is configured to generate a secondary control signal if the primary processing unit is unable to control the solenoid.

3. A system as set forth in claim 1, further comprising a primary switch in communication with the solenoid and the primary processing unit that allows current to flow to the solenoid from a primary power source, wherein the primary processing unit is configured to control the primary switch.

4. A system as set forth in claim 3, wherein the secondary processing unit is configured to disable the primary switch if the primary processing unit fails.

5. A system as set forth in claim 4, further comprising a secondary switch in communication with the solenoid and the secondary processing unit that allows current to flow from at least one of the primary power source and a secondary power source, wherein the secondary processing unit is configured to control the secondary switch if the primary processing unit fails.

6. A system as set forth in claim 1, wherein the controller is configured to measure current through the solenoid.

7. A system as set forth in claim 1, further comprising a primary signal generator in communication with the solenoid and the controller and configured to convert the primary control signal from the controller to a primary pulse width modulation signal and output the primary pulse width modulation signal to the solenoid.

8. A system as set forth in claim 7, wherein the secondary processing unit is configured to disable the primary signal generator if the primary processing unit is unable to control the solenoid.

9. A system as set forth in claim 8, further comprising a secondary signal generator in communication with the solenoid and the secondary processing unit and configured to convert a secondary control signal to a secondary pulse width modulation signal and output the secondary pulse width modulation signal to the solenoid if the primary processing unit is unable to control the solenoid.

10. A system as set forth in claim 1, wherein the intended position of the valve includes at least one of a fully open position, a fully closed position, and a partially open position.

11. A system as set forth in claim 10, wherein the intended position of the valve is associated with a duty cycle of a pulse width modulation signal.

12. A system comprising:
    at least one valve configured to control fluid flow in a dual-clutch transmission system;
    a solenoid operably connected to the at least one valve and configured to move the valve to a plurality of positions;
    a primary processing unit in communication with the solenoid and configured to determine an intended position of the valve;
    a primary switch in communication with the solenoid and the primary processing unit that allows current to flow to the solenoid from a primary power source, wherein the primary processing unit is configured to control the primary switch;
    a controller configured to receive the intended position of the valve from the primary processing unit and generate a primary control signal associated with the intended position of the valve and wherein the solenoid is configured to move the valve to the intended position based on the primary control signal;
    a primary signal generator in communication with the solenoid and the controller and configured to convert the primary control signal from the controller to a primary pulse width modulation signal and output the primary pulse width modulation signal to the solenoid;
    a secondary processing unit configured to receive information from the primary processing unit and prevent the primary control signal from controlling the solenoid if the primary processing unit is unable to control the solenoid by disabling the primary switch and the primary signal generator.

13. A system as set forth in claim 12, wherein the secondary processing unit is configured to generate a secondary control signal if the primary processing unit is unable to control the solenoid.

14. A system as set forth in claim 12, further comprising a secondary switch in communication with the solenoid and the secondary processing unit that allows current to flow from at least one of the primary power source and a secondary power source, wherein the secondary processing unit is configured to control the secondary switch if the primary processing unit is unable to control the solenoid.

15. A system as set forth in claim 12, wherein the controller is configured to measure current through the solenoid.

16. A system as set forth in claim 12, further comprising a secondary signal generator in communication with the solenoid and the secondary processing unit and configured to convert a secondary control signal to a secondary pulse width modulation signal and output the secondary pulse width modulation signal to the solenoid if the primary processing unit is unable to control the solenoid.

17. A system comprising:
    at least one valve configured to control fluid flow in a clutch-based transmission system;
    a solenoid operably connected to the at least one valve and configured to actuate the valve;

a primary processing unit configured to determine an intended position of the valve and control current flow to the solenoid;

a controller configured to generate a control signal in accordance with the intended position, wherein the solenoid is configured to actuate the valve consistent with the control signal; and a secondary processing unit configured to prevent the control signal from controlling current flow to the solenoid if the primary processing unit has failed.

18. A system as set forth in claim 17, further comprising a switch electrically connected between a power source and the solenoid, wherein the primary processing unit is configured to control current flow to the solenoid via the switch.

19. A system as set forth in claim 17, further comprising a signal generator configured to convert the control signal to a pulse width modulation signal.

* * * * *